United States Patent
Cheng et al.

(10) Patent No.: US 8,918,151 B2
(45) Date of Patent: Dec. 23, 2014

(54) PORTABLE TERMINAL AND METHOD THEREOF

(71) Applicant: HTC Corporation, Taoyuan, Taoyuan County (TW)

(72) Inventors: Shen-Hao Cheng, Taoyuan (TW); Shih-Hung Chang, Taoyuan (TW); Yueh-Hsiang Chen, Taoyuan (TW); Tzu-Hsun Tung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 54 days.

(21) Appl. No.: 13/644,879

(22) Filed: Oct. 4, 2012

(65) Prior Publication Data

US 2014/0099991 A1  Apr. 10, 2014

(51) Int. Cl.
  *H04M 1/00*  (2006.01)
(52) U.S. Cl.
  USPC ........................................ 455/575.7

(58) Field of Classification Search
  USPC ........ 455/550.1, 456.1, 404.1, 411, 517, 406, 455/41.2; 340/501, 539.12; 702/2, 187; 370/336, 259
  See application file for complete search history.

(56) References Cited

U.S. PATENT DOCUMENTS

| | | | |
|---|---|---|---|
| 2009/0295648 A1* | 12/2009 | Dorsey et al. | 343/702 |
| 2009/0309711 A1* | 12/2009 | Adappa et al. | 340/501 |
| 2011/0250928 A1* | 10/2011 | Schlub et al. | 455/550.1 |

* cited by examiner

*Primary Examiner* — Kiet Doan
(74) *Attorney, Agent, or Firm* — Birch, Stewart, Kolasch & Birch, LLP

(57) ABSTRACT

A portable device and method thereof are disclosed. The method includes recognizing a mode of the portable terminal; monitoring a sensitivity corresponding to an antenna of the portable terminal; sensing a movement corresponding to the portable terminal; invoking an application when both of following conditions occur: a degradation of the sensitivity is determined; and the movement exceeding a predetermined displacement is determined.

12 Claims, 6 Drawing Sheets

US 8,918,151 B2

PORTABLE TERMINAL AND METHOD THEREOF

BACKGROUND OF THE INVENTION

1. Field of the Invention

The invention relates to a portable terminal, and more particularly to an application determination method for a portable terminal.

2. Description of the Related Art

Portable terminals such as smart phones and tablet PCs are required to provide more intelligent user interface control as technologies advance. Various sensors and devices have been incorporated into the smart portable terminals to provide increased user-friendly device control features.

BRIEF SUMMARY OF THE INVENTION

A method performed by a portable terminal is provided. The method comprises: recognizing a mode of the portable terminal; monitoring a sensitivity corresponding to an antenna of the portable terminal; sensing a movement corresponding to the portable terminal; invoking an application when both of following conditions occur: a degradation of the sensitivity is determined; and the movement exceeding a predetermined displacement is determined.

A portable terminal is disclosed, comprising a housing, an antenna, a modem, a sensor and a processor. The antenna is disposed inside the housing. The modem, connecting to the antenna, is configured to establish a wireless communication through the antenna. The sensor is configured to sense a movement corresponding to the portable terminal. The processor, connecting to the modem and the sensor, is configured to recognize a mode of the portable terminal, monitor a sensitivity corresponding to the antenna and invoke an application when a degradation of the sensitivity is determined and when the movement exceeding a predetermined displacement is determined.

A method performed by a portable terminal is described. The method comprises: determining, by a controller, first and second antenna sensitivities for a first antenna and second antenna on the portable terminal, respectively; and determining, by the controller, a position of a blocking object on the portable terminal based on the first antenna sensitivity and second antenna sensitivity; wherein the first and second antennas are located at a first portion and a second portion of the portable terminal respectively.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
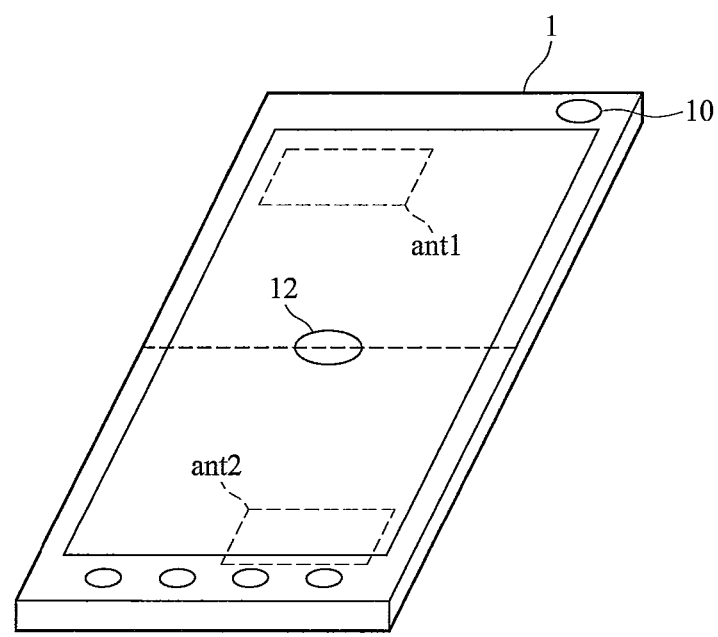
FIG. 1 is a smart phone 1 according to an embodiment of the invention where selected components are shown thereon.

Several exemplary embodiments of the invention are described with reference to FIGS. 1 through 5. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a smart phone 1 according to an embodiment of the invention, having a phone application determination method, where selected components are shown thereon. The smart phone 1 includes a first antenna ant1, a second antenna ant2, a proximity sensor 10, and an accelerometric sensor 12. The first antenna ant1 and second antennas ant2, positioned on an upper half section and a lower half section of the phone body, respectively, transmit and receive Radio Frequency (RF) signals for a wireless communication. When a user holds the smart phone 1, the user's hand may cover the position(s) of the antenna(s) where the RF signals are picked up, resulting in a reduced received signal strength and decreased antenna sensitivity. Consequently, the smart phone 1 can determine that the position of the hand on the phone body by detecting the antenna which exhibits a reduced received signal strength or decreased antenna sensitivity by a certain signal level. Further, the smart phone 1 is also equipped with various sensors for determining surrounding objects and motion thereof. For example, the proximity sensor 10 can determine that the presence of a nearby object and the accelerometric sensor 12 can detect a motion of the phone body. Based on the determined information of the hand position, the body motion and the nearby object, the smart phone 1 can automatically launch various phone functions and applications, such as a screen unlock, screen rotation, answering the phone, or other user defined functions.

Figure 2:
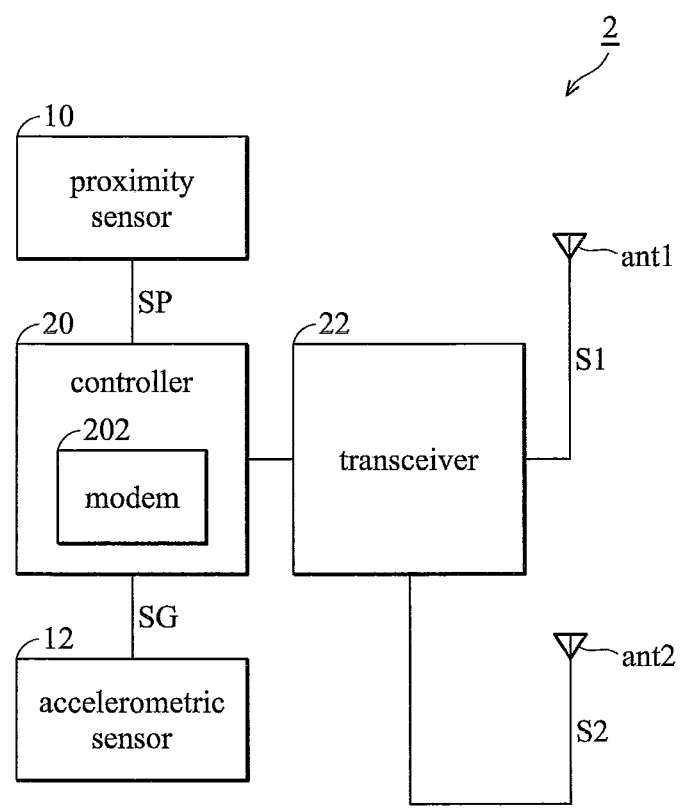
FIG. 2 is a block diagram of a handhold device 2 according to an embodiment of the invention.

FIG. 2 is a block diagram of a handhold device 2 according to an embodiment of the invention, comprising the proximity sensor 10, the accelerometric sensor 12, controller 20, transceiver 22, the first antenna ant1 and the second antenna ant2. The handhold device 2 may be a personal electronic device such as a smart phone or a tablet PC. The first and second antennas ant1 and ant 2 are coupled to a modem 200 through transceiver(s), which in conjunction with the proximity sensor 10 and the accelerometric sensor 12 are further coupled to the controller 20. The controller 20 collects position and motion information from the proximity sensor 10, accelerometric sensor 12, and antennas ant1 and ant2, and initiates an application service based on the collected information.

Specifically, the antennas ant1 and ant2 can be utilized to determine how the handhold device is held by detecting the location where the antenna signal is reduced. The smart phone 1 employs two or more antennas located on various parts of the phone body for various telecommunication technologies or spatial diversity schemes. The controller 20 can determine whether the antenna signals are obstructed according to the received signal strength or the antenna sensitivity. When the received signal strength or antenna sensitivity is attenuated or reduced, the controller 20 can determine that the corresponding antenna has been blocked. For instance, when the controller 20 can detect that the antenna sensitivity of one of the antennas ant1 and ant2 has been reduced by 5 dB, a conclusion may be determined that the portable terminal 2 is being held by one hand. In another example, the controller 20 can detect antenna sensitivities for both antennas are reduced.

The antenna sensitivity may be expressed by a Signal Noise Ratio (SNR) for a received signal picked up by the designated antenna. The antenna sensitivity may also be expressed by a data error rate such as a Bit Error Rate (BER) or a Packet Error Rate (PER) for received data picked up by the designated antenna.

The received signal strength may be expressed by a received signal strength indicator (RSSI), milliwatts (mW), decibel-milliwatts (dBm), or a percentage representation. The signal strength refers to the magnitude of the electric field at a reference point that is a significant distance from the transmitting antenna. It may also be referred to as received signal level or field strength. Typically, it is expressed in voltageper length or signal power received by a reference antenna. The RSSI metrics can be mapped to the antenna sensitivity threshold expressed in absolute dBm values according to a built-in lookup table in the controller 20. The higher the antenna sensitivity of the portable terminal 2, the greater the effective coverage range that can be experienced.

The multiple antennas may be adopted for a plurality telecommunication technologies such as Global System for Mobile communication (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, wireless local area network (WLAN) technology, Worldwide Interoperability for Microwave Access (WiMAX) technology, Long Term Evolution (LTE) technology, and others. The multiple antennas may also be utilized in the portable terminal 2 for the spatial diversity scheme, in which the multiple antennas with the same characteristics are physically separated from one another, allowing multiple users to share a limited communication spectrum and reduce co-channel interference or transmit/receive interference.

In transmission, the antennas ant1 and ant2 obtain the RF signals S1 and S2, respectively, from the air, from which signal strengths are measured and from which baseband signals are converted into by the transceiver 22. The transceiver 22 may include a power detector or a signal strength indicator processor (not shown) for determining the signal strength of the received RF signal which is subsequently outputted to the controller 20 for conversion into the antenna sensitivity. When the signal strength or the antenna sensitivity is reduced by the predetermined signal level from a previous measurement, the controller 20 can determine that the user has grabbed the portable terminal 2. The predetermined signal level may be a value such as 6 dB or a range such as 5 to 10 dB.

The proximity sensor 10 may be a reflective or a capacitive type of sensor able to detect the presence of nearby objects without any physical contact. The reflective type of the proximity sensor 10 can emit a beam of infrared and detect changes of reflection by its light sensor. The capacitive type of the proximity sensor 10 may be a capacitive photoelectric sensor suitable for a non-metallic target, outputting an electrical change as a result of a non-metal object approaching the sensor 10. The proximity sensor 10 may be positioned near the top front part of the portable terminal 2. When the user brings the portable terminal 2 close to the ear, the proximity sensor 10 can sense the user's presence.

The accelerometer 12 is embedded in the center of the portable terminal 2 to measure acceleration relative to freefall and motion in three dimensions. In some embodiments, the acceleration is measured in terms of g-force.

The controller 20 may make use of the signal strengths, the proximity status SP, and/or the motion information SG acquired from the antennas ant1 and ant2, the proximity sensor 10, and the accelerometric sensor 12, to determine a software application or function to be launched thereon, as described in methods 3, 4 and 5, thereby providing various user interface controls.

Figure 3:
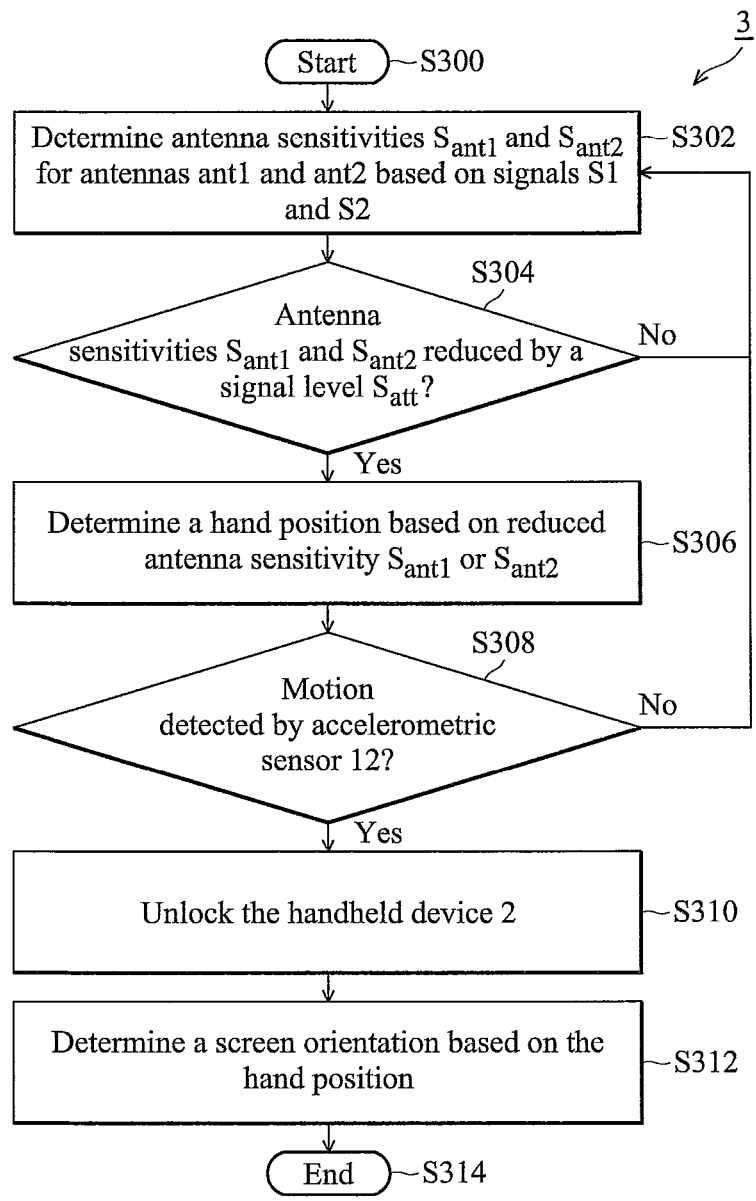
FIG. 3 is a flowchart of a unlock method 3 according to an embodiment of the invention.

FIG. 3 is a flowchart of a unlock method 3 according to an embodiment of the invention, incorporating the portable terminal 2 in FIG. 2. The unlock method 3 describes a procedure based on which the portable terminal 2 can perform a screen unlock operation.

Upon start up, all the parameters and circuits associated with the unlock method 3 are initialized and the portable terminal 2 is locked (S300). For example, the predetermined signal level is set to 5 dB. The portable terminal 2 can be automatically locked after a timeout time has elapsed to protect the portable terminal 2 from unauthorized uses and prevent unwanted input detection. Next, the first and second antennas ant1 and ant2 can receive first and second RF signals S1 and S2 from the air interface, from which pilot signals are extracted and the signal strengths are measured for the pilot signals by the transceiver 22. Further, the transceiver 22 can convert the received RF signals S1 or S2 into the baseband signal. The measured signal strengths are sent to the controller 20 to determine the corresponding antenna sensitivities Sant1 and Sant2 (S302). In some embodiments, the controller 20 can determine that the antenna sensitivities Sant1 and Sant2 by mapping the measured signal strengths for the signals S1 and S2 in a lookup table to find the corresponding antenna sensitivities Sant1 and Sant2, which can be subsequently stored in a local memory unit (not shown). The controller 20 can further determine whether the antenna sensitivities Sant1 or Sant2 were attenuated by comparing the present antenna sensitivities with the previous antenna sensitivities and determining whether the present and previous antenna sensitivities are different by substantially the predetermined signal level Satt (S304). In some embodiments, the controller 20 can determine that the antenna sensitivities Sant1 or Sant2 are attenuated when the difference of the present and previous antenna sensitivities exceeds the predetermined signal level Satt. When they do not, the unlock method 3 returns to step S302 for determining the next antenna sensitivities. When they do, the controller 20 can determine how the portable terminal 2 is held based on the antenna sensitivities Sant1 and Sant2 (S306). More specifically, the controller 20 can determine that the user may have covered the device body with the hand at the position where the attenuated antenna signal is detected. For example, when only one of the antennas ant1 and ant2 shows reduced antenna sensitivity, the controller 20 can determine that the user may be holding the portable terminal 2 with a single hand. When both of the antennas ant1 and ant2 show reduced antenna sensitivities, the controller 20 can determine that the user may be holding the portable terminal 2 with two hands. The controller 20 can also determine whether the portable terminal 2 is in any kind of motion based on the acceleration information detected by the accelerometric sensor 12 (S308). When a motion is detected by the accelerometric sensor 12, the controller 20 can confirm that the user has grabbed the handhold device 2, and thus, the portable terminal 2 is unlocked automatically (S310). Moreover, the controller 20 can determine a screen orientation based on the determined hand position and display a screen according to the screen orientation (S312). For example, the controller 20 can determine that the portable terminal is being held by a single-hand and display the screen in a portrait view, and determine the portable terminal 2 is being held with two hands and the display the screen in a landscape view. The unlock method 3 is then completed and exited (S314).

Figure 4:
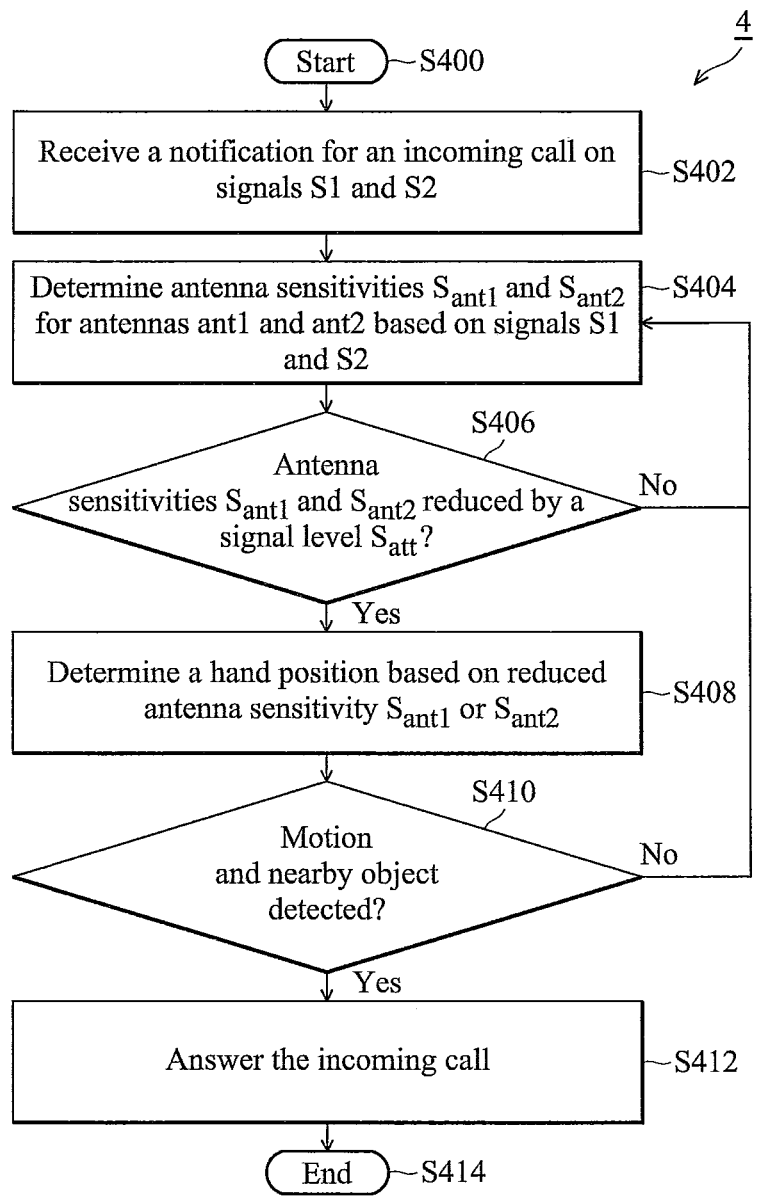
FIG. 4 is a flowchart of a phone call method 4 according to an embodiment of the invention.

FIG. 4 is a flowchart of a phone call method 4 according to an embodiment of the invention, incorporating the portable terminal 2 in FIG. 2. The call method 4 discloses a procedure based on which the portable terminal 2 can perform a call answering operation.

Upon start up, all the parameters and circuits associated with the call method 4 are initialized (S400). For example, the predetermined signal level is set to 5 dB. Next, the first and second antennas ant1 and ant2 can receive an incoming call notification on the first and second RF signals S1 and S2 (S402), from which the pilot signals are extracted and the signal strengths are measured for the pilot signals by the modem 22. The controller 20 can initiate a ring tone upon receiving the incoming call notification. Further, the transceiver can convert the received RF signals S1 or S2 into the baseband signal. The measured signal strengths are sent to the controller 20 to determine the corresponding antenna sensitivities Sant1 and Sant2 (S404). In some embodiments, the controller 20 can determine the antenna sensitivities Sant1 and Sant2 by mapping the measured signal strengths for the signals S1 and S2 in a lookup table to find the corresponding antenna sensitivities Sant1 and Sant2, which can be subsequently stored in the local memory unit (not shown). The controller 20 can further determine whether the antenna sensitivities Sant1 or Sant2 are attenuated by comparing the present antenna sensitivities and previous antenna sensitivities and determining whether the present and previous antenna sensitivities are different by the predetermined signal level Satt (S406). In some embodiments, the controller 20 can determine that the antenna sensitivities Sant1 or Sant2 are attenuated when the difference of the present and previous antenna sensitivities exceeds the predetermined signal level Satt. When they do not, the call method 4 returns to step S404 for determining the next antenna sensitivities. When they do, the controller 20 can further determine whether the portable terminal has been brought near to the face of the user for answering the call by detecting the motion and the nearby object information from the proximity sensor 10 then the accelerometric sensor 12 (S408). When it hasn't, the call method 4 again returns to step S404 for determining the next antenna sensitivities. When both events occur, the motion and the nearby object are detected, the controller 20 can automatically initiate a call answering procedure on the portable terminal 2 for answering an incoming call, so that the user can answer the call directly without further action (S410). The call method 4 is then completed and exited (S412).

Figure 5:
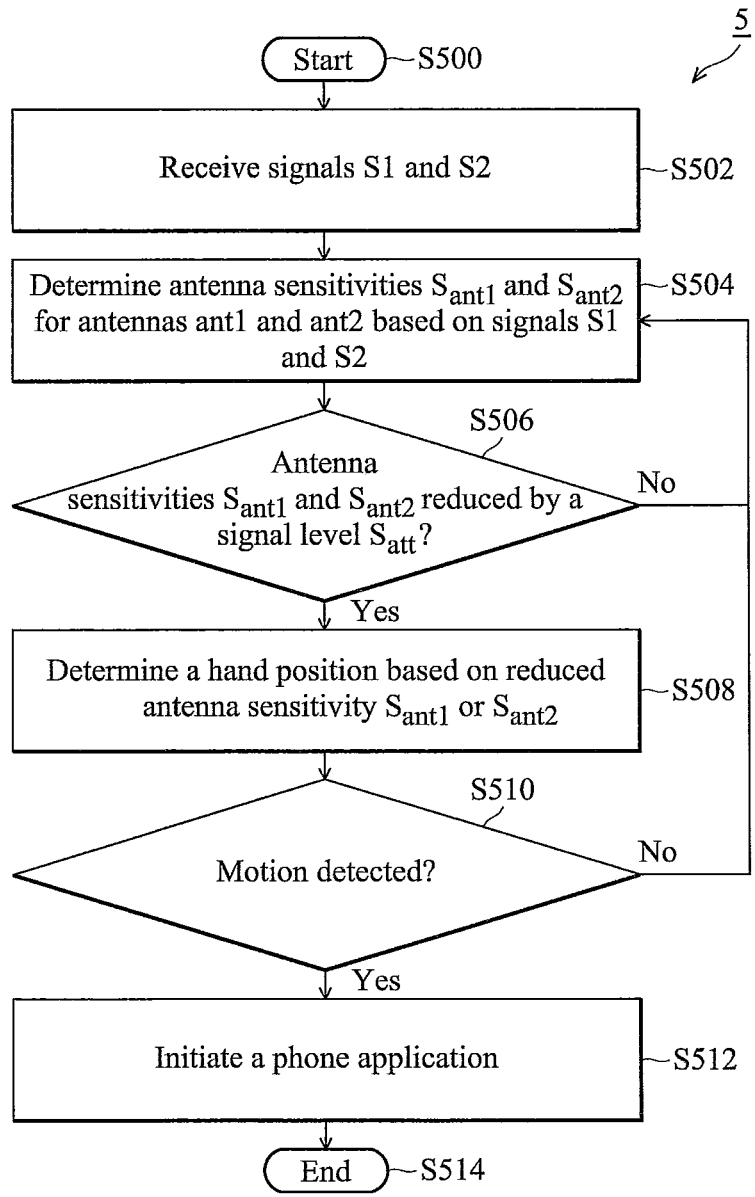
FIG. 5 is a flowchart of a phone application determination method 5 according to an embodiment of the invention.

FIG. 5 is a flowchart of an application determination method 5 according to an embodiment of the invention, incorporating the portable terminal 2 in FIG. 2.

Upon start up, all the parameters and circuits associated with the application determination method 5 are initialized (S500). The first and second antennas ant1 and ant2 may receive the first and second RF signals S1 and S2 (S502), from which the pilot signals are extracted and the signal strengths are measured for the pilot signals by the transceiver 22. The controller 20 can initiate a ring tone upon receiving incoming call notification. Further, the transceiver 22 can convert the received RF signals S1 or S2 into the baseband signal. The measured signal strengths are sent to the controller 20 to determine the corresponding antenna sensitivities Sant1 and Sant2 (S504). In some embodiments, the controller 20 can determine the antenna sensitivities Sant1 and Sant2 by mapping the measured signal strengths for the signals S1 and S2 in a lookup table to find the corresponding antenna sensitivities Sant1 and Sant2, which can be subsequently stored in the local memory unit (not shown). The controller 20 can further determines whether the antenna sensitivities Sant1 or Sant2 are attenuated by comparing the present antenna sensitivities and previous antenna sensitivities and determining whether the present and previous antenna sensitivities are different by the predetermined signal level Satt (506). In some embodiments, the controller 20 can determine that the antenna sensitivities Sant1 or Sant2 are attenuated when the difference of the present and previous antenna sensitivities exceeds the predetermined signal level Satt. When they do not, the application determination method 5 returns to step S404 for determining the next antenna sensitivities. When they do, the controller 20 can determine how the portable terminal 2 is being held based on the antenna sensitivities Sant1 and Sant2 (508). For details for determining the hand held position, reference may be found in the preceding discussion for the method 3. The controller 20 can then determine whether an auxiliary signal has been detected by a sensor on the portable terminal (S510). The sensor may be the proximity sensor 10, the accelerometric sensor 12, a gyroscopic sensor, or other smart phone sensors. The controller 20 can automatically initiate a phone application on the portable terminal 2 according to the hand position information and the auxiliary signal (S512). The application determination method is then completed and exited (S514).

Although the embodiments illustrated in the unlock method 3, the call method 4, and the application determination method 5 employ the antenna sensitivities to determine signal blockage for the antennas ant1 and ant2, those with ordinary skills in the art should recognize that other signal strength associated parameters may be utilized in place of the antenna sensitivities. Further, more than two antennas occupied on various parts of the portable terminal 2 may be incorporated to determine the hand positions or gestures for the user interface control on the portable terminal 2.

The unlock method 3, the call method 4, and the application determination method 5 offer convenient methods for various user interface controls by detecting the locations of antennas with attenuated antenna signals.

Figure 6:
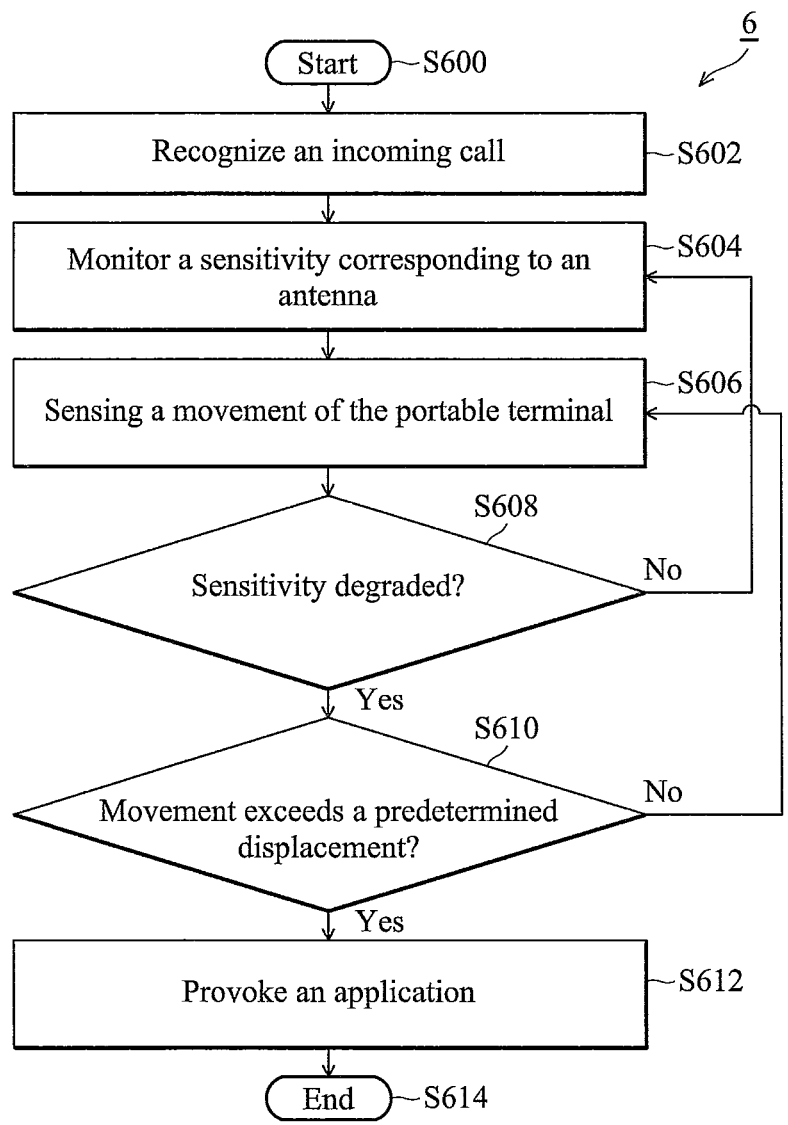
FIG. 6 is a flowchart of a control method 6 according to an embodiment of the invention

FIG. 6 is a flowchart of a control method 6 according to an embodiment of the invention, incorporating the portable terminal 2 in FIG. 2.

Upon start up, all the parameters and circuits associated with the control method 6 are initialized (S600). The first or second antennas ant1 and ant2 may receive the first or second RF signals S1 and S2 indicating an incoming call from a communication service network, thereby the controller 20 can recognize an incoming call mode based on the received signals S1 or S2 (S602), The controller 20 can determine the first sensitivity Sant1 and the second sensitivity Sant2 corresponding to the first and second antennas ant1 and ant2 based on the signals and data monitored by the corresponding antennas ant1 and ant2 (S604). Concurrently, the accelerometric sensor 12 can continuously or regularly sense the movement of the portable terminal 2 (S606). Based on the monitored first sensitivity Sant1 or the second sensitivity Sant2, the controller 20 can determine whether the current first sensitivity Sant1 or the second sensitivity Sant2 is degraded, attenuated or reduced with respect to the previous first sensitivity Sant1 or the previous second sensitivity Sant2

(S608). When the first sensitivity Sant1 or the second sensitivity Sant2 are substantially unchanged, or the changes are less than a predetermined sensitivity threshold (first threshold), e.g., 5 dB, the controller 20 can determine that the first sensitivity Sant1 or the second sensitivity Sant2 is not degraded, attenuated or reduced and the control method 6 can return to Step S604 for continuing monitoring the sensitivities. When the first sensitivity Sant1 or the second sensitivity Sant2 exceeds the predetermined sensitivity threshold, the controller 20 can determine that the first sensitivity Sant1 or the second sensitivity Sant2 is degraded, attenuated or reduced, and carry on to determine whether the movement of the portable terminal 2 has exceeds a predetermined displacement (S610). When the movement of the portable terminal 2 is within the predetermined displacement, e.g., 5 cm, the controller 20 can determine that portable terminal 2 remains at substantially the same position, and the control method 6 can return to Step S606 for continuing sensing the movement of the portable terminal 2. When the movement of the portable terminal 2 exceeds the predetermined displacement, the controller 20 can determine that portable terminal 2 is moved or picked up by the user purposely. In response, the controller 20 can invoke a corresponding application program such as initiating a ring tone, decreasing a ring tone, or unlocking a display screen for the portable terminal 2. (S612). After the application program are invoked and completed, the control method 6 are completed and exited.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. For example, modem 202 can comprise a single modem 202 or multiple modems while each modem can pair with a single transceiver 22 or multiple transceivers (not shown). The controller 20 shown in FIG. 2 can be a processor, an application processor, or any other means can execute the function described previously. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, controlled by a portable terminal, comprising:
   recognizing a mode of the portable terminal in response to a first signal received via a primary antenna and a second signal received via a secondary antenna;
   monitoring a first sensitivity of the primary antenna and a second sensitivity of the secondary antenna of the portable terminal;
   sensing a movement corresponding to the portable terminal;
   invoking an application when both of following conditions occur:
   the movement exceeding a predetermined displacement is determined
   a degradation of at least one of the first sensitivity and the second sensitivity is determined in response to the determined degradation;
   wherein the primary antenna is located at a first portion of the portable terminal, the secondary antenna located at a second portion of the portable terminal, and the first and second portion are spatially apart from each other.

2. The method of claim 1, wherein the mode represents a phone incoming mode.

3. The method of claim 1, wherein the degradation of the first sensitivity is determined by measuring whether a variation of the first sensitivity has exceeded a first threshold.

4. The method of claim 1, wherein the step of invoking an application comprising decreasing a ring tone volume.

5. The method of claim 1, wherein the step of invoking an application comprising unlocking a display screen of the portable terminal.

6. A portable terminal, comprising:
   a housing;
   a primary antenna located inside a first portion of the housing;
   a secondary antenna located a second portion of the housing, wherein the first and second portion are spatially apart from each other;
   a sensor, configured to sense a movement corresponding to the portable terminal;
   a processor connecting to the modem and the sensor, configured to:
   recognize a mode of the portable terminal in response to a first signal received via the primary antenna and a second signal received via the secondary antenna;
   monitor a first sensitivity of the primary antenna and a second sensitivity of the secondary antenna of the portable terminal; and
   invoke an application when a degradation of at least one of the first sensitivity and the second sensitivity is determined and when the movement exceeding a predetermined displacement is determined in response to the determined degradation;
   further comprises a proximity sensor, coupled to the processor, configured to sense a nearby object, wherein the processor is further configured to: determine whether the nearby object is present; and invoke the application when the nearby object is determined to be present.

7. The portable terminal of claim 6, wherein the application is an unlock service for unlocking the portable terminal.

8. A method performed by a portable terminal, comprising:
   determining, by a controller, first and second antenna sensitivities for a first antenna and second antenna on the portable terminal, respectively;
   determining, by the controller, a position of a blocking object on the portable terminal based on the first antenna sensitivity and second antenna sensitivity;
   determining a motion of the portable terminal based on acceleration sensed by a sensor; and
   initiating a phone application based on the position of the blocking object upon determination of the motion, wherein the first and second antennas are located at a first portion and a second portion of the portable terminal respectively;

further comprising receiving a notification message which notifies an incoming call from the first antenna or the second antenna;

determining, by a proximity sensor, whether a nearby object is present;

the initiating step comprises initiating a phone call service for answering the incoming call when the position of the blocking object and the presence of the nearby object are determined.

9. The method of claim 8, wherein:
the determining the position of the blocking object step comprises determining that the position of the blocking object is at where the first antenna sensitivity or second antenna sensitivity is reduced; and
the initiating step comprises initiating an unlock service for unlocking the portable terminal when the position of the blocking object is determined.

10. The method of claim 8, wherein:
the determining the position of the blocking object step comprises determining the position of the blocking object is at where the first antenna sensitivity or second antenna sensitivity is reduced; and
the initiating step comprises initiating a rotation service for displaying a landscape view on the portable terminal when the position of the blocking object is determined to be at the upper and lower half sections of the portable terminal concurrently.

11. The method of claim 8, wherein the determining of the first and second antenna sensitivities step comprises:
determining, by a modem, a first signal strength and a second signal strength for signals from the first and second antennas, respectively; and
determining, by the controller, the first and second antenna sensitivities corresponding to the first and second signal strengths, respectively.

12. The method of claim 8, wherein the determining of the first and second antenna sensitivities step comprises:
determining, by a modem, a first data error rate and a second first data error rate for data from the first and second antennas, respectively; and
determining, by the controller, the first and second antenna sensitivities corresponding to the first and second data error rates, respectively.

* * * * *